United States Patent [19]

Neilson

[11] Patent Number: 5,328,263
[45] Date of Patent: Jul. 12, 1994

[54] APPARATUS FOR MIXING INGREDIENTS IN A RECEPTACLE

[76] Inventor: Jim L. Neilson, 9205 Lime Crest Ct., Elk Grove, Calif. 95624

[21] Appl. No.: 42,519

[22] Filed: Apr. 5, 1993

[51] Int. Cl.$^5$ .............................................. B01F 7/32
[52] U.S. Cl. .................................................. 366/254
[58] Field of Search ............... 366/241, 242, 244, 245, 366/247, 249, 251, 252, 254, 255, 285, 286, 197, 199

[56] References Cited

U.S. PATENT DOCUMENTS

| | | | |
|---|---|---|---|
| 1,408,033 | 2/1922 | Reidel | 366/197 |
| 1,418,099 | 5/1922 | Sigal | 366/285 |
| 1,459,148 | 6/1923 | Flynt | 366/252 |
| 2,024,383 | 12/1935 | Newham | 366/201 |
| 2,431,298 | 11/1947 | Nichols | 366/197 |
| 3,295,997 | 1/1967 | Tomlinson | 366/197 |
| 3,326,532 | 6/1967 | Lodge | 366/286 |
| 4,547,076 | 10/1985 | Maurer | 366/244 |
| 4,723,849 | 2/1988 | Boring | 366/285 |
| 5,145,250 | 9/1992 | Planck | 366/249 |
| 5,150,967 | 9/1992 | Neilson et al. | |

FOREIGN PATENT DOCUMENTS 1008176  5/1957  Fed. Rep. of Germany ...... 366/241

Primary Examiner—Timothy F. Simone
Assistant Examiner—Terrence R. Till
Attorney, Agent, or Firm—Thomas R. Lampe

[57] ABSTRACT

Apparatus for mixing ingredients in a receptacle includes a lid having an aperture which is positionable on the receptacle. A mixer shaft extends downwardly through the lid aperture and the shaft is movable relative to both the lid and to the receptacle to permit a mixer head connected to the shaft to move downwardly and upwardly within the receptacle after the lid has engaged the receptacle.

6 Claims, 8 Drawing Sheets

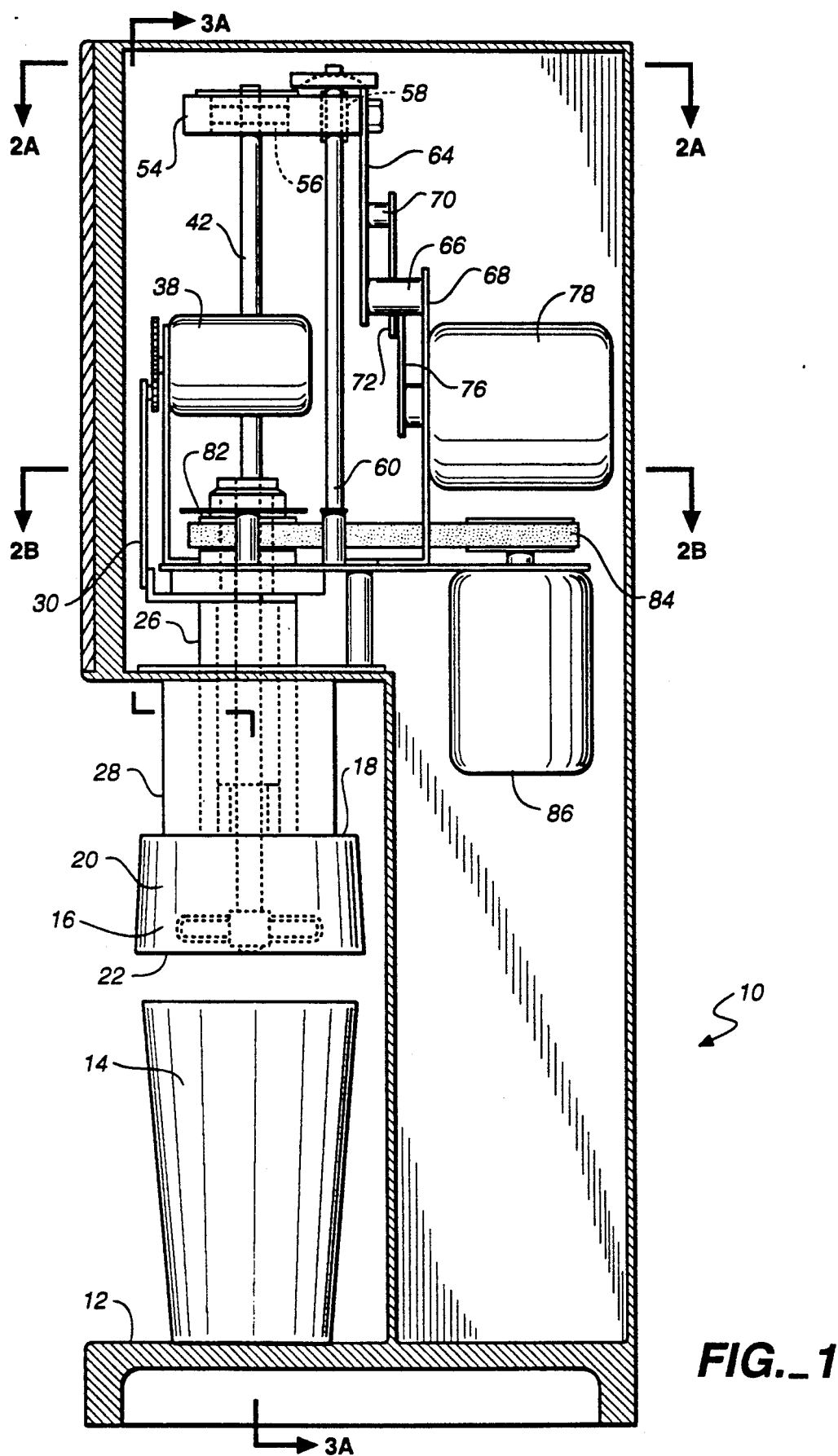
FIG._1

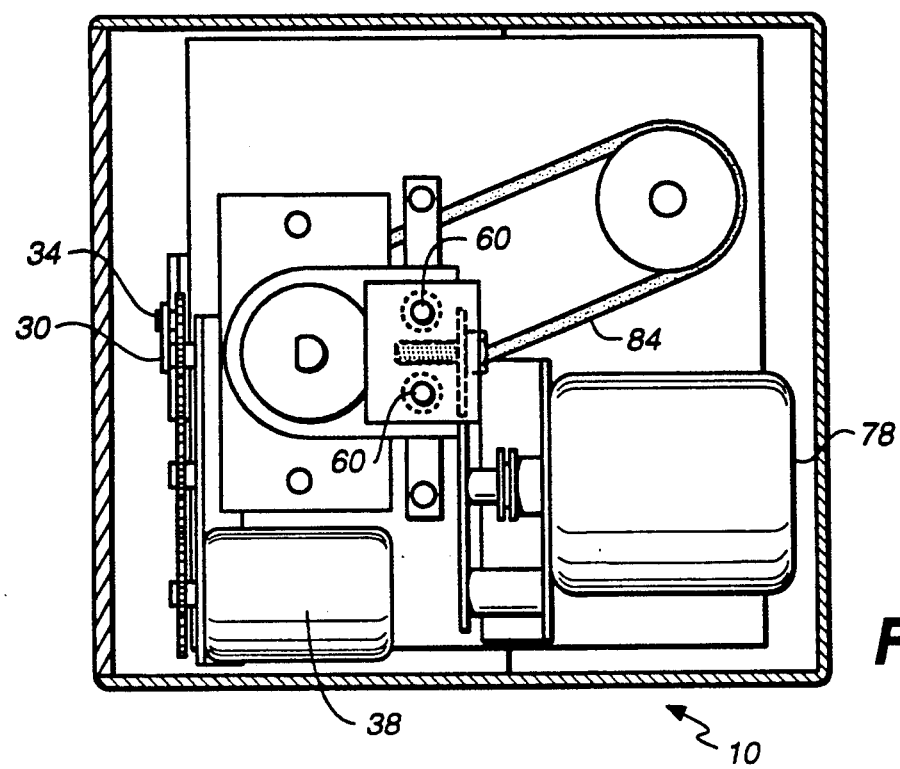
FIG._2A
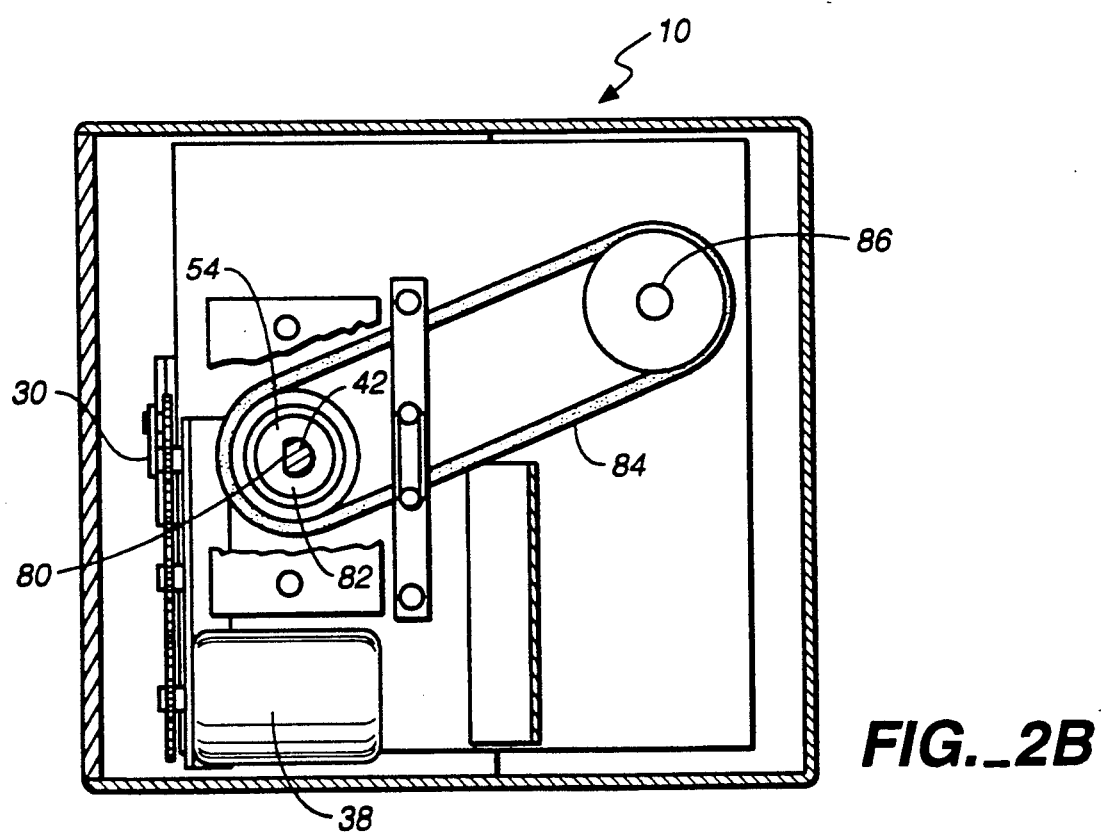
FIG._2B

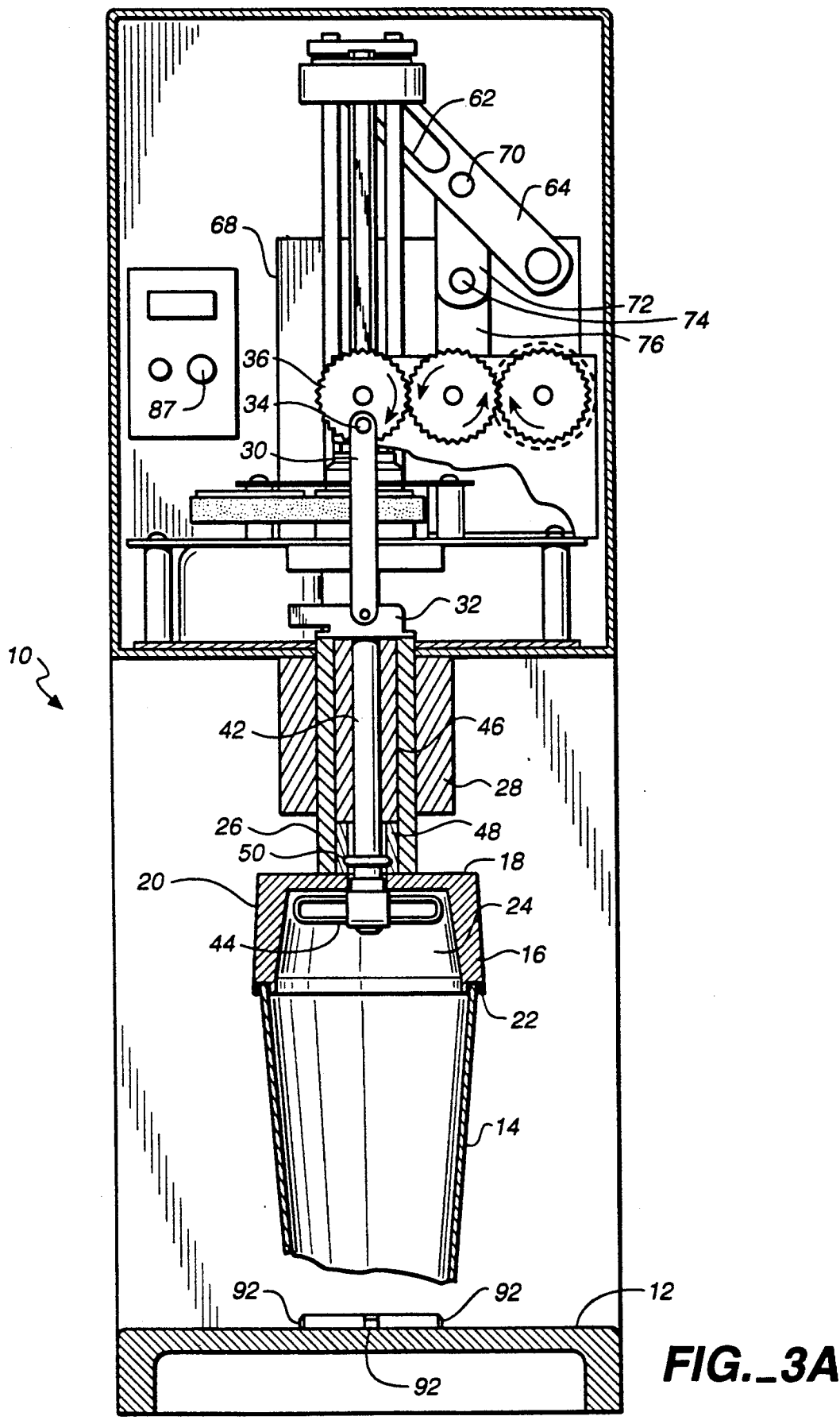
FIG._3A

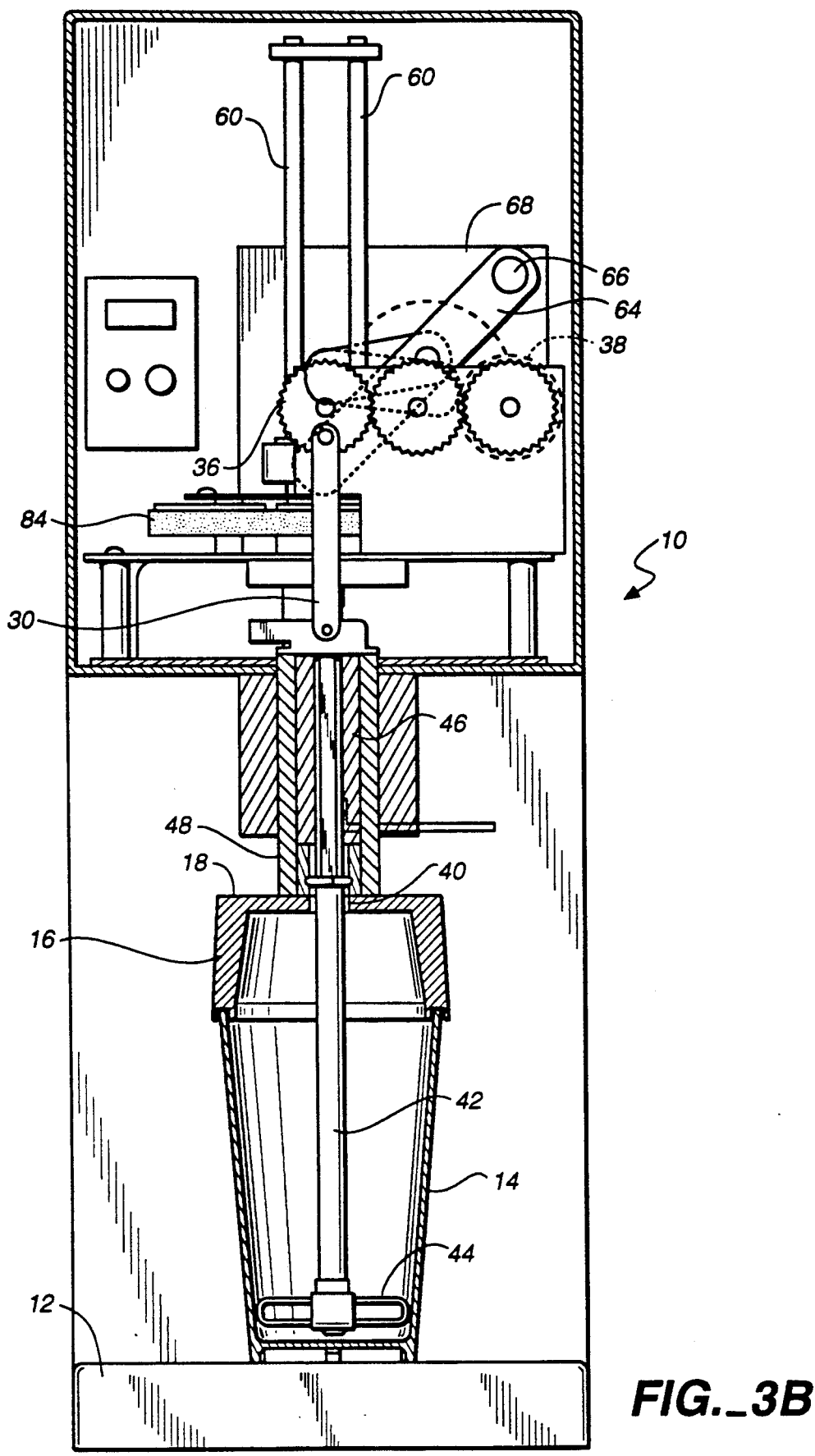
FIG._3B

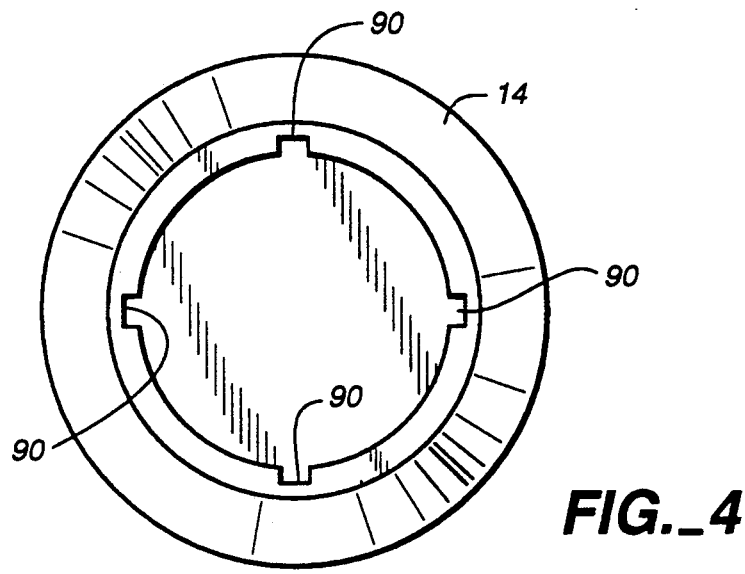
FIG._4
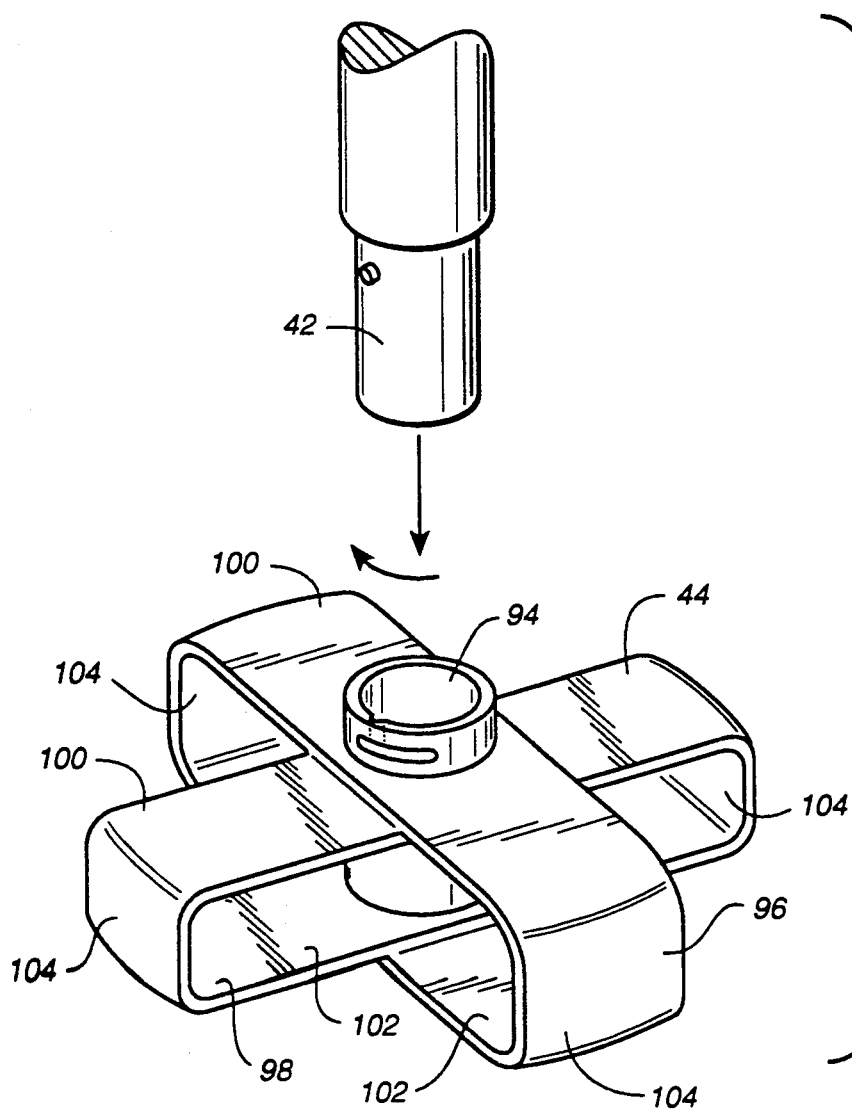
FIG._5

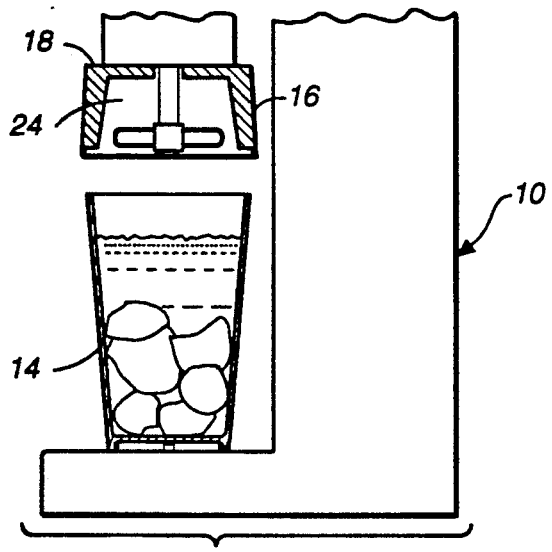
*FIG._6A*
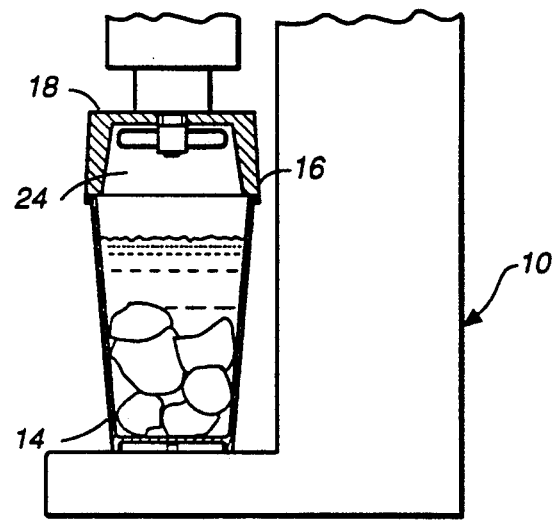
*FIG._6B*
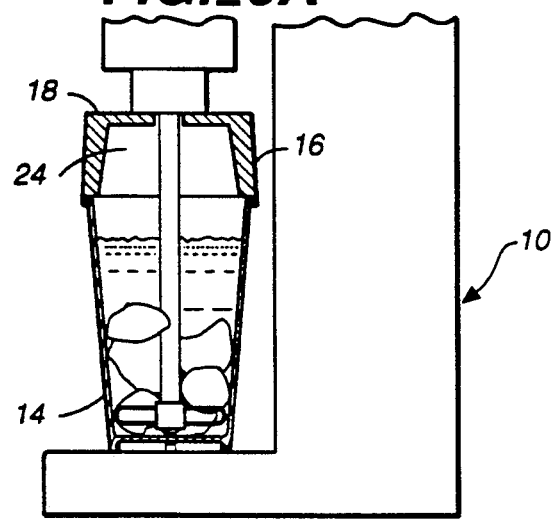
*FIG._6C*
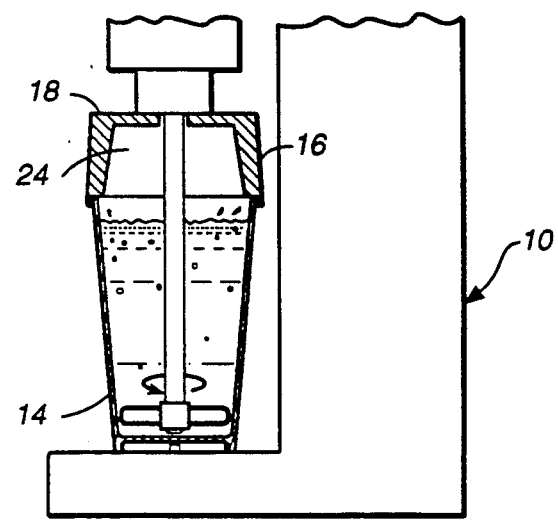
*FIG._6D*
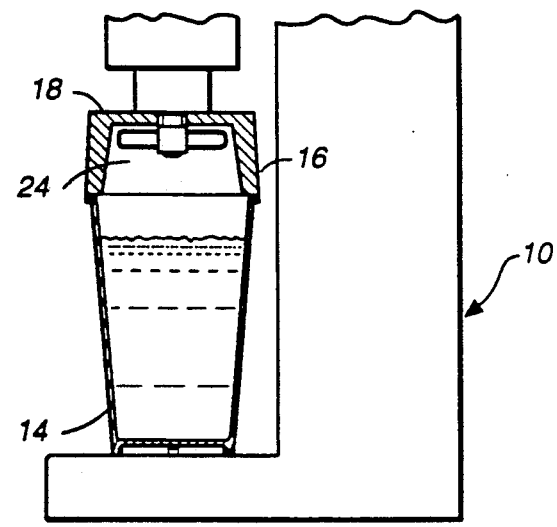
*FIG._6E*
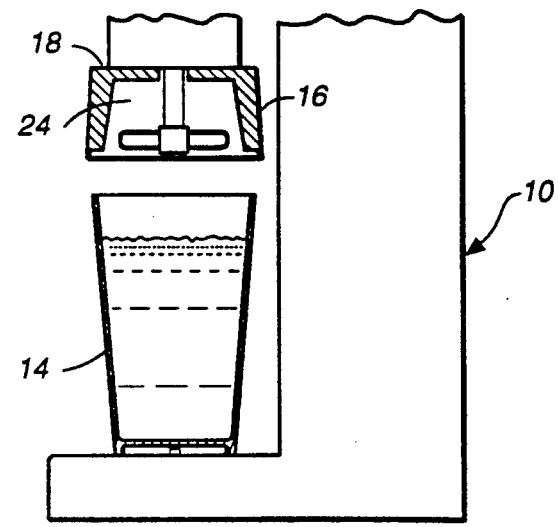
*FIG._6F*

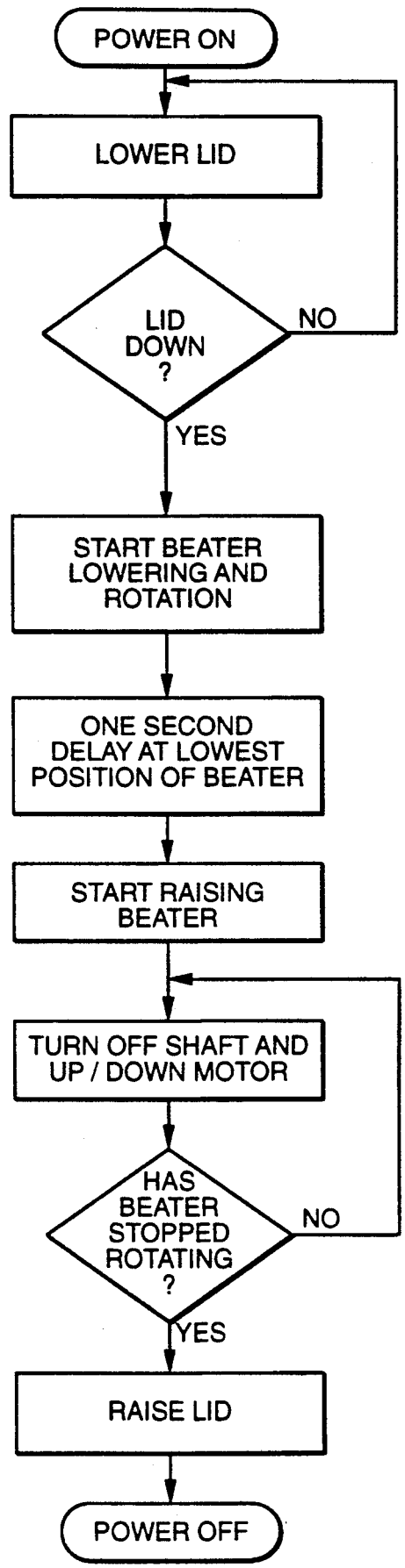
FIG._7

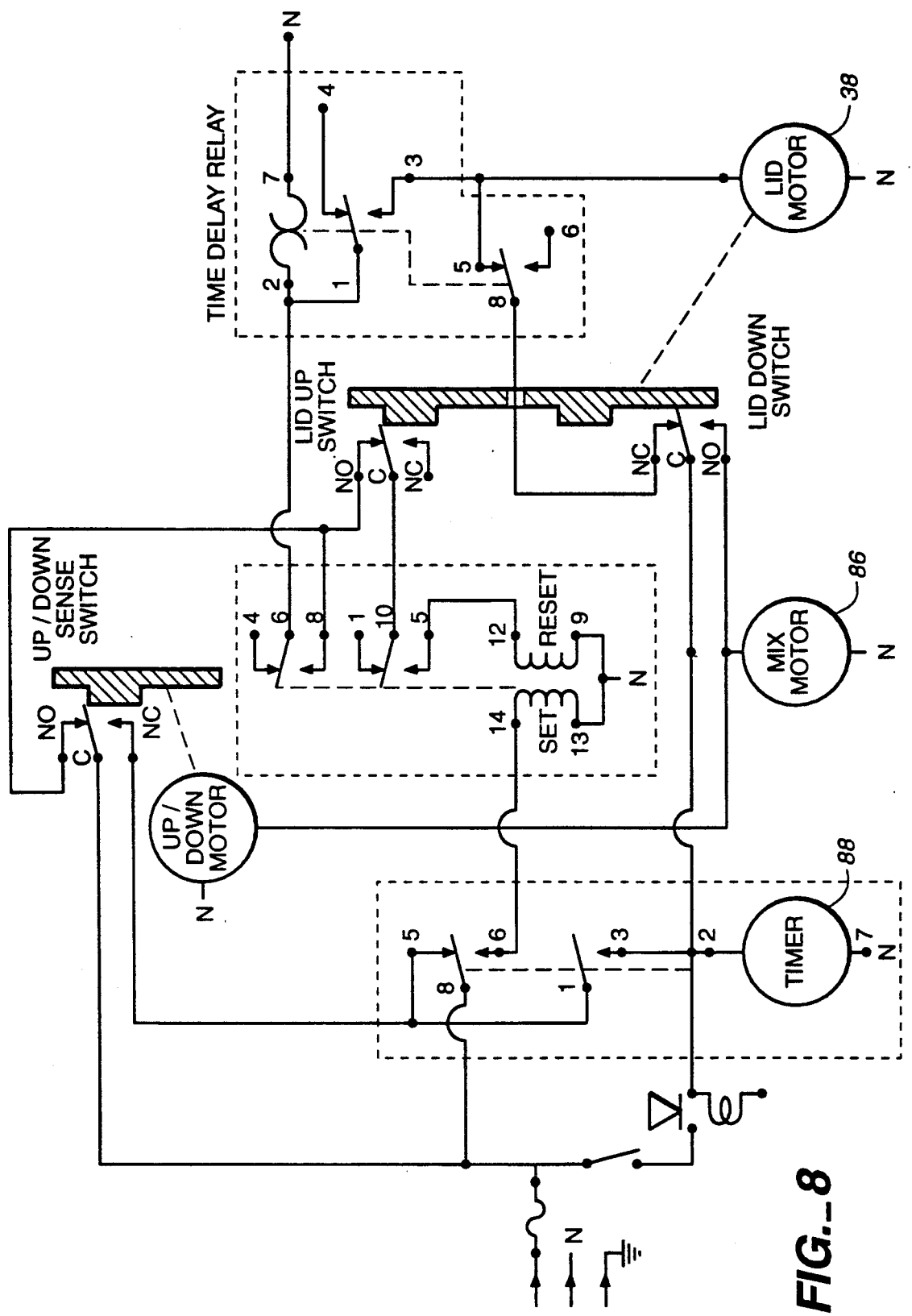
FIG._8

APPARATUS FOR MIXING INGREDIENTS IN A RECEPTACLE

TECHNICAL FIELD

This invention relates to apparatus for mixing ingredients in a receptacle. The invention has particular application to the blending of ice cream into milk shakes and malts.

BACKGROUND ART

U.S. Pat. No. 5,150,967, issued Sep. 29, 1992, discloses a milk shake machine for mixing thick, hard ice cream shakes. The machine incorporates a housing to which a container is locked and sealed, the container being in a suspended, elevated condition. Two gear motors are disposed within the housing, one employed to rotate a shaft and mixing head and the other to move the mixing head vertically within the container.

Also known in the prior art are conventional milk shake machines consisting of an electric motor, shaft, and mixing disc. The device is supported on a stand or hangs from a wall bracket. When one wishes to make a hard ice cream milk shake, a metal cup is manually held under the revolving shaft and disc while the cup is manually manipulated vertically and in a stirring motion. This method is time consuming and inefficient and may even introduce foreign matter into the mixture as a result of the mixing head coming into contact with the sides of the metal cup.

While the milk shake machine disclosed in U.S. Pat. No. 5,150,967 has a number of advantages over the conventional prior art milk shake machines, it too has certain deficiencies, not the least of which is the fact that the cup or receptacle is not positively supported on its bottom, but rather is suspended from its upper end in mid air. This approach can result in spillage if the user does not properly connect the receptacle to the housing. Some difficulties may also arise with respect to cleaning of the housing structure at the point of attachment of the container or receptacle to the housing.

DISCLOSURE OF INVENTION

The present invention relates to apparatus for mixing ingredients in a receptacle, such as hard ice cream in a milk shake, wherein the receptacle is positively supported on its bottom during the mixing operation. Furthermore, the apparatus is easy to clean and maintain and does not require the services of an attendant during operation thereof.

The apparatus is for mixing ingredients in a receptacle having a bottom and side wall defining an interior and an opening communicating with said interior.

The apparatus includes a support and also a lid having a top wall defining an aperture, the top wall being positionable over the receptacle.

Lid placement means is connected to the support for moving the lid relative to the support from an elevated position wherein the lid is not in engagement with the receptacle to a lower position wherein the lid engages the receptacle to substantially close the receptacle opening.

A mixer shaft is supported by the support and extends through the lid aperture. The mixer shaft is movable relative to the lid and to the receptacle and has a lower end. A mixer head is connected to the shaft lower end under the lid.

Transport means is connected to the support for transporting the mixer shaft and mixer head downwardly within the receptacle after the lid has engaged the receptacle. Rotating means is provided for rotating the mixer shaft and mixer head within the receptacle.

The receptacle is positionable on the support to support the receptacle. The apparatus additionally comprises securement means to secure the receptacle against rotation on the support during rotation of the mixer shaft and mixer head within the receptacle.

Other features, advantages, and objects of the present invention will become apparent with reference to the following description and accompanying drawings.

BRIEF DESCRIPTION OF DRAWINGS

FIG. 1 is a side elevational view, with housing shown in cross section, of a milk shake machine constructed in accordance with the teachings of the present invention;

FIGS. 2A and 2B are cross-sectional views taken, respectively, along the lines 2A—2A and 2B—2B in FIG. 1;

FIG. 3A is a cross-sectional view taken along the line 3A—3A in FIG. 1 and illustrating selected components of the machine in the relative positions assumed thereby during one phase of operation of the machine;

FIG. 3B is a view similar to FIG. 3A but illustrating the selected components of the machine in the relative positions assumed thereby during another phase of the operation of the machine;

FIG. 4 is an enlarged bottom view of the receptacle employed with the apparatus;

FIG. 5 is a greatly enlarged top perspective view of the mixer head of the apparatus and mixer shaft;

FIGS. 6A through 6F are schematic diagrams illustrating the sequential stages of operation of the apparatus with respect to selected components thereof;

FIG. 7 is a flow diagram illustrating the operational sequence of the apparatus; and FIG. 8 is a circuit diagram employed to operate the apparatus.

BEST MODE FOR CARRYING OUT THE INVENTION

Referring now to the drawings, a preferred form of apparatus constructed in accordance with the teachings of the present invention includes a support comprising a housing 10. The form of apparatus illustrated is a milk shake mixing machine; however, it will be understood that the teachings of the invention are applicable to any type of apparatus for mixing ingredients in a receptacle, for example a food blender.

The support or housing 10 has a platform 12 for supporting a receptacle in the form of a cup or container 14, it being understood that the receptacle is manually positioned on and removed from the platform. Receptacle 14, as is conventional, has a bottom and side wall defining an interior and an opening at the upper end thereof communicating with the interior.

Receptacle 14, when positioned on platform 12, is disposed under a lid 16 having a top wall 18. A tapered wall having a circular cross section extends downwardly from top wall 18 and is designated by reference numeral 20. Tapered wall 20 has a lower rim 22 which is of a size and configuration corresponding to the top of the receptacle 14. That is, the rim 22 of lid 16 will engage the receptacle side wall when the lid and receptacle are axially aligned and brought into engagement.

A recess 24 is defined by the top wall and tapered wall of the lid.

Lid 16 is connected to and supported by a cylindrically-shaped lid support element 26 which is mounted for reciprocal up and down movement within an enlargement 28 comprising part of the housing 10. Up and down movement of the lid support element 26 and the lid 16 is effected by a crank arm 30 affixed to a cap 32 which in turn is affixed to lid support element 26. The upper end of crank arm 30 is connected to a stub shaft 34 on a rotatable gear or drive element 36 driven by a gear mounted on the drive shaft of electric motor 38 through an intermediate gear. It will be appreciated that the aforedescribed mechanism operates as an eccentric drive which will move the lid 16 relative to the support from an elevated position (shown in FIGS. 1, 6A, and 6F) wherein the lid is not in engagement with receptacle 14 to a lower position (shown in FIGS. 3A and 3B, for example) wherein the lid engages the receptacle to close the receptacle opening at the top of the receptacle.

Lid top wall 18 defines an aperture 40 therein which communicates with the lid recess 24. A mixer shaft 42 is disposed within aperture 40. A mixer head 44, which will be described in greater detail below, is connected to the shaft lower end under the lid top wall. The shaft 42 is freely rotatable within aperture 40 of the lid.

Mixer shaft 42 passes upwardly through and is rotationally movable relative to a pair of bushings 46, 48 which are connected together in axial alignment with the throughbores thereof also in axial alignment. It will be noted that bushing 48 accommodates an O-ring 50 of rubber, plastic or other suitable resilient material which will serve to wipe the shaft 42 when it is moved axially relative to the bushings 46, 48. Preferably, bushing 48 is removable, so that the O-ring can be replaced and cleaning facilitated.

The upper end of mixer shaft 42 is supported by and rotatably journaled in a circular ball bearing 56 within a support housing 54. Support housing 54 has two bearings 58 which slidably receive guide posts 60. A bolt extends outwardly from housing 54 and projects through a slot 62 defined by a link arm 64 pivoted about pivot shaft 66 connected to mounting plate 68.

Link arm 64 is pivotally connected by pivot pin 70 to a second link arm 72. The other end of second link arm 72 is pivotally connected by pivot pin 74 to a crank arm 76. Crank arm 76 is fixedly connected to the output shaft of a gear motor 78 attached to mounting plate 68. It will be appreciated that rotation of crank arm 76 by gear motor 78 will result in movement of link arm 64 to reciprocally pivot the link arm 64 between the upper position shown in FIG. 3A and the lower position shown in FIG. 3B. Movement of the link arm 64 from its upper position to its lower position will cause support housing 54 to move downwardly, the path of movement being linear due to the cooperation between bearings 58 and guide posts 60. Return of the link arm 64 to its upper or elevated position will cause the support housing 54 to move to its upper position shown in FIG. 3A. Since the mixer shaft 42 is supported by support housing 54, the mixer shaft and mixer head will move up and down correspondingly.

At the upper end thereof, mixer shaft 42 has a flat side 80 (FIG. 2B). The top portion of the mixer shaft extends downwardly through a spline bearing 82. Spline bearing 82 permits free up or down motion of the mixer shaft but is operable to transmit rotational torque to the mixer shaft. Such rotation is effected by a drive belt 84 positioned about the rotatable spline bearing 82 and also about the output shaft of an electrical motor 86. When motor 86 is actuated, the belt will rotate with the output shaft of the motor and rotate spline bearing 82, in turn rotating mixer shaft 42 and mixer head 44.

Having described operative components of the apparatus, the operation thereof will now be set forth. First, the operator places a receptacle 14 under the lid 16 when the lid is in the raised position as shown in FIGS. 1 and 6A. The operator then initiates operation by energizing electric motor 38 to lower the lid 16 and bring it into engagement with the side wall of the receptacle 14 as shown in FIGS. 3A and 6B. It should be noted that downward movement of the lid 16 is also relative to the stationary mixer shaft 42. Thus, the mixer head 44 is disposed at the lower end of the lid recess prior to downward movement of the lid so that the mixer head will not interfere with such downward movement and will end up being closely adjacent to the top wall 18 of the lid when the lid rim engages the receptacle.

Next, the electric motor 86 is actuated to rotate the mixer shaft and mixer head and the gear motor 78 is energized to move the mixer shaft and mixer head downwardly as shown in FIGS. 3B and 6C to bring the rotating mixer head closely adjacent to the bottom of the receptacle. Rotation is continued as shown in FIG. 6D to thoroughly mix the contents of the receptacle.

Next, the mixer shaft and mixer head are moved upwardly under the continuing action of gear motor 78 to move the mixer head up to the top of the lid recess as shown in FIG. 6E. The electric motor 86 is then de-energized to stop rotation of the mixer shaft and mixer head.

It will be noted that the mixer head is closely adjacent to both the top wall and tapered wall of the lid when the mixer head is at its uppermost position and the lid is still in engagement with the receptacle. This promotes the removal of excess material from the mixer head and allows such material to drip down into the receptacle.

As mentioned above, the O-ring 50 also contributes to the cleaning of the apparatus and more particularly of the mixer shaft since it exerts a wiping action on the shaft as the shaft is drawn upwardly.

Finally, the lid placement means including motor 38 and crank arm 30 pulls the lid 16 to its elevated position shown in FIG. 6F.

It is anticipated that the foregoing sequence of operations is carried out automatically upon initial actuation of the device by the operator, as by means of a push button or switch, such as that designated by reference numeral 87. Such sequence is illustrated diagrammatically in FIG. 7. A circuit diagram of a circuit which may be employed for such purpose is illustrated in FIG. 8. It will be noted that the circuit incorporates a timer 88 to run the machine through as many cycles as deemed appropriate by the operator. However, in the case of milk shakes, one cycle of approximately 10 seconds duration will prepare a high quality shake, even when employing hard ice cream.

Means is provided to prevent rotation of cup or receptacle 14 during the mixing operation so that the operator need not manually hold and maintain the receptacle in place and against such rotation. More specifically, in the arrangement illustrated, the bottom of the receptacle has indents 90 formed at the bottom thereof at spaced locations about the bottom. These indents 90 receive corresponding detents or projections 92 located on and projecting upwardly from platform 12 of the support. In addition to preventing rotation of the receptacle, the indents and detents cooperate to ensure that the receptacle is properly placed relative to the platform and thus relative to the lid and mixer head.

FIG. 5 shows details of the mixer head 44. The mixer head includes a cylindrical portion 94 which receives the lower end of the mixer shaft 42. A quick release mechanism such as the pin and slot arrangement illustrated may be employed to removably secure the cylindrical portion to the shaft end. Two bands 96, 98 of stainless steel or the like are secured to the cylindrical portion 94. Each band includes an upper band wall 100, a lower band wall 102, and spaced side band walls 104 connected to the upper and lower band walls. The walls of each band define a loop of generally rectangular, cross-sectional configuration. Each band is elongated and has a primary axis, the bands being affixed to each other at the centers of the upper and lower band walls with the primary axes of the bands disposed at right angles. It has been found that a mixer head construction of the type shown provides for highly efficient and effective mixing of ingredients and readily lends itself to cleaning.

I claim:

1. Apparatus for mixing ingredients, said apparatus comprising, in combination:

a support selectively releasably supporting a receptacle having a bottom and side wall defining an interior and an opening communicating with said interior;

a lid having a top wall defining an aperture and a side wall extending downwardly from said top wall and defining a lid recess communicating with said aperture, said top wall positionable over a receptacle supported by said support;

lid placement means connected to said support for moving said lid relative to said support from an elevated position wherein said lid is not in engagement with said receptacle to a lower position wherein said lid positively engages and seals said receptacle to substantially close the opening of said receptacle and wherein said recess is disposed above the receptacle interior and in communication therewith;

a mixer shaft supported by said support and extending through the lid aperture, said mixer shaft and said placement means being separately and independently supported by said support and said mixer shaft being both axially and rotatably movable relative to said lid, to said support and to said receptacle and having a lower end;

a mixer head connected to said shaft lower end under said lid top wall;

transport means connected to said support for transporting said mixer shaft and mixer head downwardly within said receptacle after said lid has engaged said receptacle from a first position wherein the mixer head is disposed within said lid recess and above the receptacle interior to a second position wherein the mixer head is within the receptacle interior and closely adjacent to the receptacle bottom and for subsequently transporting said mixer shaft and mixer head from said second position to said first position; and rotating means including a drive motor fixedly connected to said support for rotating said mixer shaft and mixer head within said receptacle during transport of said mixer head between said first and second positions and while said mixer shaft moves axially through said lid aperture.

2. The apparatus according to claim 1 wherein said apparatus additionally comprises securement means to position said receptacle in substantial alignment with said lid and secure said receptacle against rotation on said support during rotation of said mixer shaft and mixer head within said receptacle, said securement means comprising matingly engageable indents and detents on said support and receptacle, said indents and detents being engaged when said receptacle is lowered into position on said support and disengaged when said receptacle is raised from said support.

3. The apparatus according to claim 1 wherein said lid additionally includes a tapered wall extending downwardly from said top wall and diverging away from said top wall, said tapered wall having a rim engageable with said receptacle side wall, said mixer head being closely adjacent to both said lid top wall and tapered wall both before and after transport of said mixer shaft and mixer head downwardly within said receptacle.

4. The apparatus according to claim 1 wherein said mixer head includes at least two bands, each said band including an upper band wall, a lower band wall, and spaced side band walls connected to said upper and lower band walls, the walls of each band defining a loop of generally rectangular, cross-sectional configuration, each said band being elongated and having a primary axis, said bands being affixed to each other at the centers of said upper and lower band walls with the primary axis of said bands disposed at angles.

5. The apparatus according to claim 1 wherein said transport means includes a motor having an output shaft and a mechanical linkage operatively associated with said motor output shaft and mixer shaft to reciprocally transport said mixer shaft and mixer head responsive to rotation of said motor output shaft.

6. The apparatus according to claim 5 additionally comprising guide means affixed to said support and cooperable with said mixer shaft to guide reciprocal axial movement of said mixer shaft.

* * * * *